US011263279B1

(12) United States Patent
Ross et al.

(10) Patent No.: US 11,263,279 B1
(45) Date of Patent: Mar. 1, 2022

(54) METHODS AND SYSTEMS FOR IDENTIFYING HIGH VALUE TARGETS USING SOCIAL MEDIA ACTIVITY

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 142 days.

(21) Appl. No.: 16/673,590

(22) Filed: Nov. 4, 2019

Related U.S. Application Data (63) Continuation of application No. 14/576,619, filed on Dec. 19, 2014, now Pat. No. 10,467,303.

(60) Provisional application No. 61/920,093, filed on Dec. 23, 2013.

(51) Int. Cl.
*G06F 16/9535* (2019.01)
*H04L 29/08* (2006.01)
*H04L 67/306* (2022.01)

(52) U.S. Cl.
CPC ........ *G06F 16/9535* (2019.01); *H04L 67/306* (2013.01)

(58) Field of Classification Search
CPC ........................... G06F 16/9535; H04L 67/306

USPC ......................................................... 707/737
See application file for complete search history.

(56) References Cited

U.S. PATENT DOCUMENTS

| 9,756,006 B2* | 9/2017 | Shapero .................. H04L 51/26 |
|---|---|---|
| 10,319,045 B2* | 6/2019 | Frank ..................... G06Q 50/01 |
| 2009/0125320 A1 | 5/2009 | Bickett |
| 2011/0208822 A1* | 8/2011 | Rathod ............... G06F 16/9535 709/206 |
| 2013/0144818 A1* | 6/2013 | Jebara .................... G06N 20/00 706/12 |
| 2013/0179438 A1* | 7/2013 | Coldicott .......... G06F 16/24578 707/723 |
| 2013/0282594 A1 | 10/2013 | Gaedcke et al. |
| 2014/0129493 A1 | 5/2014 | Leopold |
| 2014/0195549 A1* | 7/2014 | Ahn .................... G06F 16/9535 707/749 |

(Continued)

*Primary Examiner* — Dangelino N Gortayo
(74) *Attorney, Agent, or Firm* — Foley & Lardner LLP (57) ABSTRACT

System and methods for an agent tool that identifies high value targets within a particular area, based on an individual's social media activity are disclosed. A computing device displays a user interface generated by an analysis module, and receives an agent's search criteria. Then, the analysis module scans a plurality of social media sites and selects the profile of individuals according to the search criteria. Next, the analysis module identifies the profile of members who are associated to the profile of each previously selected individual, and compares them with the profile of pleased customers. If both profiles match, then the analysis module has identified a high value target. The system also provides the full profile of each high value target found, when needed. The agent tool identifies high value targets in a simpler, less time-consuming and inexpensive way, while increasing the company's revenue.

16 Claims, 5 Drawing Sheets

(56) References Cited

U.S. PATENT DOCUMENTS

2014/0244530 A1* 8/2014 Baldwin ............ G06Q 10/1053
705/319

* cited by examiner

METHODS AND SYSTEMS FOR IDENTIFYING HIGH VALUE TARGETS USING SOCIAL MEDIA ACTIVITY

CROSS-REFERENCE TO RELATED APPLICATIONS

This application is a continuation application of U.S. patent application Ser. No. 14/576,619, filed Dec. 19, 2014, which claims priority to U.S. Provisional Patent Application No. 61/920,093, filed Dec. 23, 2013, each of which is incorporated herein by reference in its entirety.

FIELD OF THE DISCLOSURE

The present disclosure relates in general to data processing, and more specifically to methods and systems to process data pertaining to an individual across a plurality of social media sites to identify high value targets within a particular area.

BACKGROUND

Businesses are always looking for ways to increase revenue and increase its sales to new customers. Conventional marketing strategies that an agent uses to attract new customers include TV advertising, email newsletters, hosting local networking events, and the traditional door-to-door relationship building. These conventional strategies take significant amounts of financial resources and may be a time-consuming and a very demanding task. In addition, these strategies are useful for attracting small amounts of new prospects who belong to any geographic area or are associated with any business sector, and who may not end up joining the company as customers at the end of the process.

However, it is a well-known fact that the most effective way to attract a new customer is by the referral of a satisfied customer, but this may be insufficient for attracting a high number of new customers. Currently, there are limited approaches that agents may use in order to identify individuals who have high referral potential.

For the aforementioned reasons, there is a need for systems and methods that may improve over the conventional approaches for identifying individuals with high referral potential and attracting new customers.

SUMMARY

Embodiments in the present disclosure are directed to provide systems and methods for identifying high value targets within a particular area, based on an individual's social media activity. An unconventional approach for identifying new customers is through the leveraging of information associated with satisfied customers that is derived from one or more social media sites. Social media sites such as social networking systems, professional networking systems, and blogging systems, among others, allow an individual to interact, share, and communicate with other members within a network or a group with a variety of backgrounds, interests, and other characteristics. Every social media site associates each member to a profile which includes information such as relationship status, birth date, age, number of children, hometown, occupation, address, and the type of direct association of an individual with other members within the social media site. This information derived from one or more social media profiles is useful to characterize an individual and find individuals who have high referral potential within a particular area, in an easier and faster manner.

According to an embodiment, a computed-implemented system architecture for identifying high value targets based on data analytics, includes different components which dynamically interact with each other through network connections. In an exemplary embodiment, an agent tool system architecture may one or more internal databases, and one or more external databases operatively coupled to an analysis module, among other system components. Further to this embodiment, the system also includes a user interface through which users, such as agents, interact with the analysis module by means of a computing device. The computing device is any computer type device that receives, processes, and/or transmits digital data. The computing device includes a bus that enables the communication between components such as input/output devices, one or more interfaces, one or more memories, one or more storage devices and one or more central processing units, among other system components.

According to another embodiment, a computed implemented process for identifying high value targets starts when the analysis module receives a single or multiple search criteria from an agent interacting with a computing device displaying a user interface. In this embodiment, the analysis module scans the data obtained from the profile of one or more individuals in a plurality of social media sites to derive personal information used to identify those individuals who satisfy the search criteria using network mapping techniques.

In these exemplary embodiments, the analysis module also identifies the profile of members who are directly associated with the individual's profile within one or more social media sites, and compares the profile of those members with the profile of pleased customers stored in the company's internal database. If both profiles match, then the analysis module characterizes the member as a pleased customer who may refer the individual to the company. As a result, the analysis module characterizes the individual associated with the member who is a pleased customer, as a high value target with high referral potential. Subsequently, the computing device displays the user interface showing a sorted list of high value targets in descending order according to the number of members who may refer each high value target.

In some embodiments, an agent retrieves a high value target's full profile when needed. In these embodiments, the agent selects the high value target from the sorted list shown in the user interface displayed on the computing device. Further to this embodiment, the analysis module receives the agent's request and retrieves the full profile of the high value target with high referral potential, from one or more social media sites where the high value target may have a personal profile. The high value target's full profile is shown to the agent through the user interface on his/her computing device.

The exemplary systems and methods can leverage rich information generated by individuals through their activity in one or more social media sites by identifying one or more individuals who are high value targets with high referral potential belonging to a particular geographic area, associated with a particular business sector or a combination of both. Additionally, the systems and methods can be used for identifying a greater amount of new customers in a simpler, less time-consuming and inexpensive way, while increasing the company's revenue.

In one embodiment, a computer-implemented method comprises receiving, by an analysis module of a server, search criteria from an agent computing device; identifying, by the analysis module of the server, a plurality of profiles of individuals on a social media site using the received search criteria; deriving, by the analysis module of the server, a plurality of member profiles on the social media site that are directly associated with the identified individual profiles; comparing, by the analysis module of the server, each of the plurality of member profiles with profiles of customers in a customer database to determine if the profile of the member matches a customer profile in the customer database; and generating, by the analysis module of the server, a list of individual profiles for presentation on a graphical user interface of the agent computing device wherein the individual profiles are ordered based upon how many customer profiles are associated with each individual profile.

In one aspect, the method further comprises receiving, by the server, a selection of a member on the list of member profiles; retrieving, by the server, a profile of the member on the social media site; and presenting, by the server, the profile of the member on the social media site to the graphical user interface of the agent computing device. The search criteria can be based on a geographic area. The search criteria can be based on a business sector. The method can further comprise designating, by the analysis module of the server, the individual as a higher potential target based upon whether the customer profile characterizes the member as a pleased customer. The method can further comprise presenting, by the analysis module of the server, an ordered list of individual profiles based upon how many members are associated with the individual and are characterized as pleased customers. The method can further comprise eliminating, by the analysis module of the server, an individual profile from the plurality of individual profiles when at least one member directed associated with that individual profile is not characterized as a pleased customer.

In another embodiment, a system comprises a database storing customer profile records; a network configured to communicatively couple the database with a social media site; a server comprising a processor and an analysis module executed by the processor, wherein the analysis module is configured to receive search criteria from an agent computing device via the network; identify a plurality of profiles of individuals on the social media site using the received search criteria; derive a plurality of member profiles on the social media site that are directly associated with the identified individual profiles; compare each of the plurality of member profiles with customer profile records in the database to determine if the profile of the member matches a customer profile in the database; and generate a list of individual profiles for presentation on a graphical user interface of the agent computing device wherein the individual profiles are ordered based upon how many customer profiles are associated with each individual profile.

In one aspect, the system further comprises an agent interface portal configured to communicatively connect the agent computing device with the server via the network, wherein the agent interface portal presents the graphical user interface for display on the agent computing device. The server can be further configured to receive a selection of a member on the list of member profiles; retrieve a profile of the member on the social media site; and present the profile of the member on the social media site to the graphical user interface of the agent computing device. The search criteria can be based on a geographic area. The search criteria can be based on a business sector. The server can be further configured to designate the individual as a higher potential target based upon whether the customer profile characterizes the member as a pleased customer. The server can be further configured to present an ordered list of individual profiles based upon how many members are associated with the individual and are characterized as pleased customers. The server can be further configured to eliminate an individual profile from the plurality of individual profiles when at least one member directed associated with that individual profile is not characterized as a pleased customer.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Definitions

As used here, the following terms may have the following definitions:

"Agent" refers to an individual working for a company, or as a broker, with an interest in identifying high value targets.

"High value target" refers to an individual with high referral potential.

"Individual" refers to any person belonging to a particular geographic region and/or associated with a particular business sector, who is linked to the profile of one or more pleased customers in one or more social media sites.

"Member" refers to any person associated with an individual's profile within one or more social media sites.

"Pleased customer" refers to a current customer of a company who is satisfied with one or more products and services provided by the company.

"Potential customer" refers to any person who has an interest in acquiring a product and/or service of a company.

DESCRIPTION OF THE DRAWINGS

The present disclosure describes systems and methods for identifying new potential customers with high referral potential. In these embodiments, an analysis module receives a search request from an agent, to identify one or more potential customers who satisfy the defined search criteria. In this embodiment, the search criteria is a geographic region, a particular group of people associated with any economic, industrial and/or commercial activity, or a combination of both, among other search criteria. Further to this embodiment, the analysis module presents a list of high value targets with high referral potential to one or more agents, where this list is sorted in descending order according to the number of pleased customers who can refer each high value target. In some embodiments, the analysis module generates a full profile for each high value target when needed.

Figure 1:
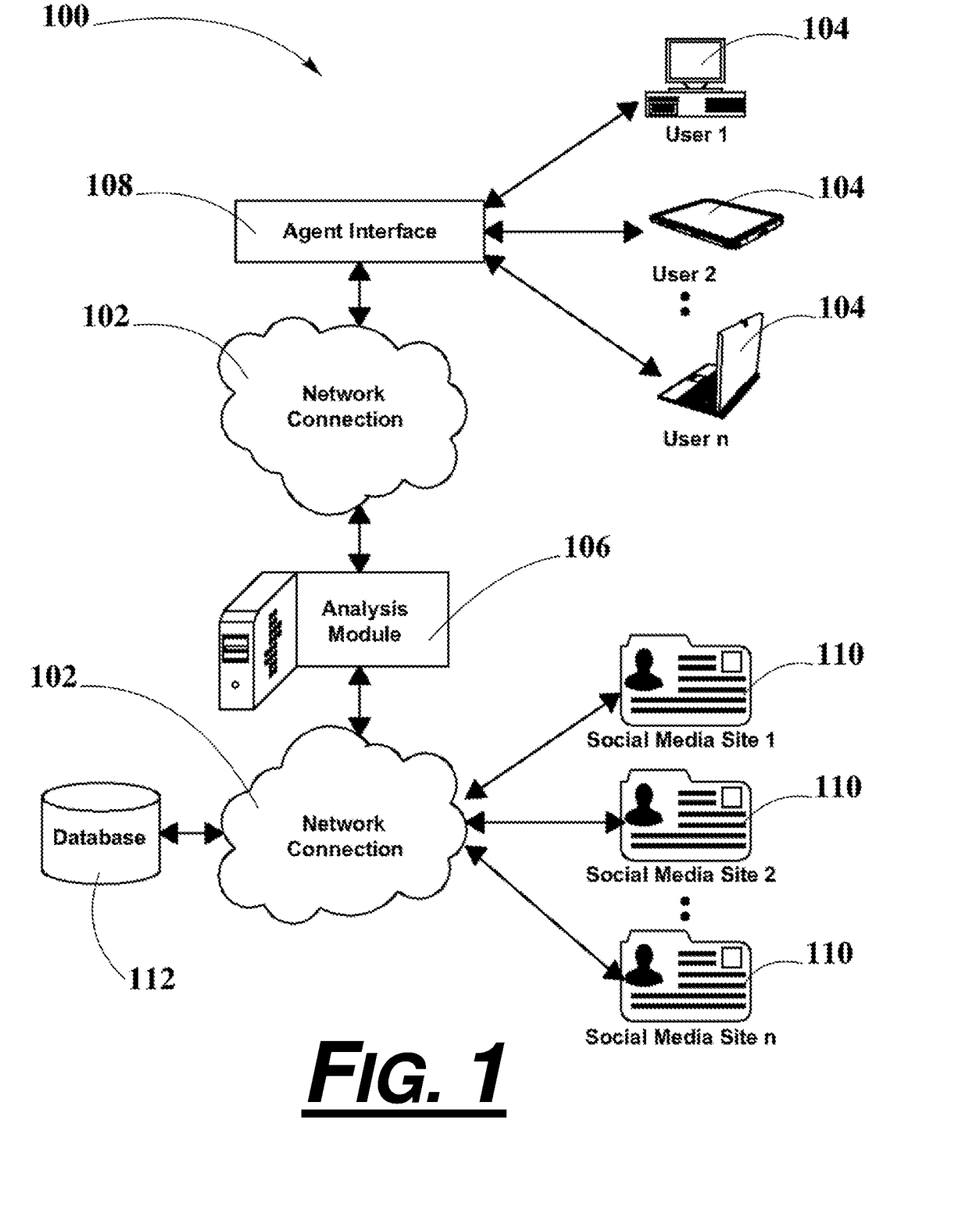
FIG. 1 is an exemplary system architecture of an agent tool for identifying high value targets, according to an exemplary embodiment.

FIG. 1 is an exemplary system architecture 100 of an agent tool for identifying high value targets, according to an embodiment. The disclosed system architecture 100 includes different components which dynamically interact with each other through network connections 102. Network connections 102 refer to a network connection between computers such as, for example, intranets, local area networks (LANs), virtual private networks (VPNs), wide area networks (WANs) and the internet, among others.

According to some embodiments, the agent tool system architecture includes one or more client computing devices 104 and a plurality of servers (not shown in FIG. 1) having the necessary hardware and software to implement the aforementioned system components, among others. Examples of firmware and/or hardware and associated software enabling functionality of the aforementioned system components will be further described in FIG. 2, below.

In these embodiment, client computing device 104 displays a user interface 108 which supports human-computer interactions and acts as a single portal for accessing different features of an analysis module 106 that is executed by a computing device, such as a server. The user interface 108 can be a thin or thick client from the server and displayed on the client computing device 104. Examples of client computing devices 104 include smartphones, desktop computers, laptop computers, tablets, PDAs, and/or other type of processor-controlled device that can receive, process and/or transmit digital data. Further to these embodiments, analysis module 106 includes a processing unit for running related algorithms or computer executable program instructions that are executed by a server, a single computer, or multiple computers within a distributed configuration. In these embodiments, the processing unit includes a processor with computer-readable medium such as, for example, random access memory (RAM), coupled to the processor. Examples of processor types include a microprocessor, an application specific integrated circuit (ASIC) and a field programmable object array (FPOA), among others.

In some embodiments, analysis module 106 is operatively coupled to one or more databases 112 and one or more social media sites 110. In these embodiments, database 112 stores the profile of pleased customers of a company including name, address, phone number, birth place, birth date, age, and number of children, among other attributes. Further to these embodiments, social media sites 110 include rich site summary feeds, social news and book marking sites, and blogging sites, as well as social networking sites, such as Facebook, and LinkedIn, among others. In these embodiments, database 112 is implemented through known in the art database management systems (DBMS) such as, for example, MySQL, PostgreSQL, SQLite, SAP, Microsoft SQL Server, Microsoft Access, Oracle, dBASE, FoxPro, IBM DB2, LibreOffice Base, FileMaker Pro and/or any other type of database that can organize collections of data.

In these embodiments, analysis module 106 generates user interface 108 which is configured to receive a single or multiple search criteria for identifying high value targets within a particular area, from one or more agents interacting with client computing device 104 via an input/output (I/O) device such as, a touch screen or a mouse, a keyboard and/or a keypad working in concert with a display, and others. Further to these embodiments, analysis module 106 also generates a full profile for each high value target identified. In one embodiment, the high value target full profile is generated based on the information derived from one or more social media sites 110 where the high value target may have a personal profile. In these embodiments, client computing device 104 displays user interface 108 generated by analysis module 106, to show the sorted list of high value targets and the full profile of each high value target, to one or more agents. In some embodiments, analysis module 106 generates additional user interfaces 108 on client computing device 104 that may correspond to tasks not specific to the sub-applications described herein.

Figure 2:
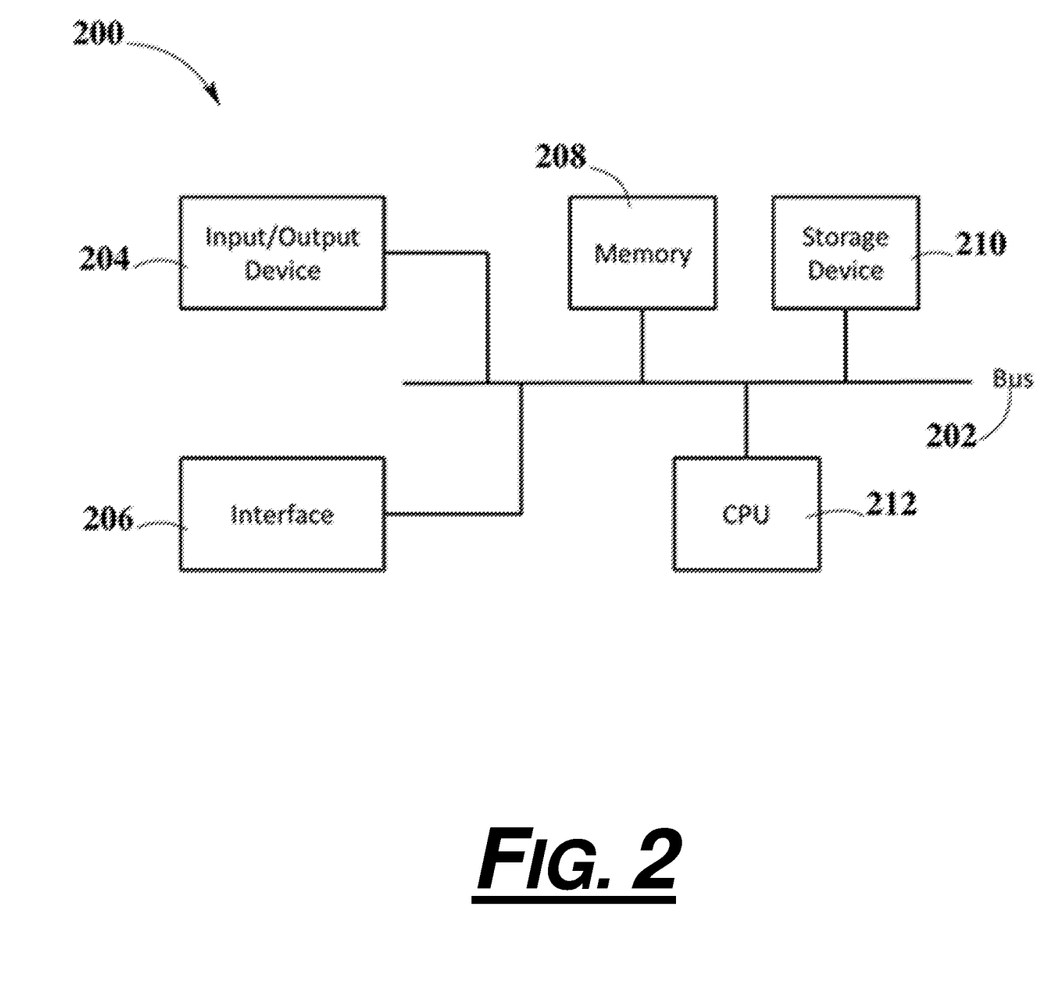
FIG. 2 is an exemplary computing device or server, according to an exemplary embodiment.

FIG. 2 is an exemplary computing device 200 in which one or more embodiments of the present disclosure may operate. In one embodiment, computing device 200 includes bus 202, input/output (I/O) device 204, communication interface 206, memory 208, storage device 210 and central processing unit (CPU) 212. In another embodiment, computing device 200 includes additional, fewer, different, or differently arranged components than those illustrated in FIG. 2.

In FIG. 2, bus 202 is in physical communication with I/O device 204, communication interface 206, memory 208, storage device 210 and central processing unit 212. Bus 202 includes a path that permits components within computing device 200 to communicate with each other. Examples of I/O device 204 include a peripheral and/or other mechanisms that enable a user to input information to computing device 200 such as, for example, a keyboard, a computer mouse, a track ball, other input buttons, touch screens, voice recognition devices, biometric mechanisms devices and the like. I/O device 204 also includes a mechanism that outputs information to the user of computing device 200 such as, for example, a display, a light emitting diode (LED), a printer, a speaker and the like.

In FIG. 2, communication interface 206 is a device that enables computing device 200 to communicate with other computing devices and/or systems through network connections (not shown in FIG. 2), such as, for example, Wi-Fi cards, Ethernet and the like. Network connections refer to a network connection between computers that allows computing device 200 to exchange data, such as, for example, intranets, local area networks (LANs), virtual private networks (VPNs), wide area networks (WANs), the internet and the like. Memory 208 is a device that stores software programs or data used in computing device 200, such as, for example, random access memory (RAM), read-only memory (ROM), flash memory and the like. Storage device 210 is a device that stores and retrieves information, such as, for example, magnetic and/or optical recording medium, Ferro-electric RAM (F-RAM) hard disks, solid-state drives, floppy disks, optical discs and the like. In one embodiment, memory 208 and storage device 210 store information and instructions for execution by one or more central processing units 212. Examples of central processing units 212 include a microprocessor, an application specific integrated circuit (ASIC), a field programmable object array (FPOA) and the like. In this embodiment, central processing unit 212 interprets and executes instructions retrieved from memory 208 and storage device 210.

In some embodiments, computing device 200 can be implemented as part of a server, a client computing device and the like, such as client computing device 104 in system architecture 100 of FIG. 1. Examples of implementations of computing device 200 include servers, authorized client computing devices 104, smartphones, desktop computers, laptop computers, tablet computers, PDAs and other types of processor-controlled devices that receive, process, and/or transmit digital data. In an example, computing device 200 performs certain operations that are required for the proper operation of system architecture 100. Computing devices 200 perform these operations as a result of central processing unit 212 executing software instructions contained within a computer-readable medium, such as within memory 208.

In one embodiment, the software instructions of the system are read into memory 208 from another memory location, such as from storage device 210, or from another computing device 200 (e.g., client computing devices 104 and the like) via communication interface 206. In this embodiment, the software instructions contained within memory 208 cause central processing unit 212 to perform processes that will be further described in FIG. 3, below. Alternatively, hardwired circuitry may be used in place of or in combination with software instructions to implement the processes described herein. Thus, implementations described herein are not limited to any specific combinations of hardware circuitry and software.

Figure 3:
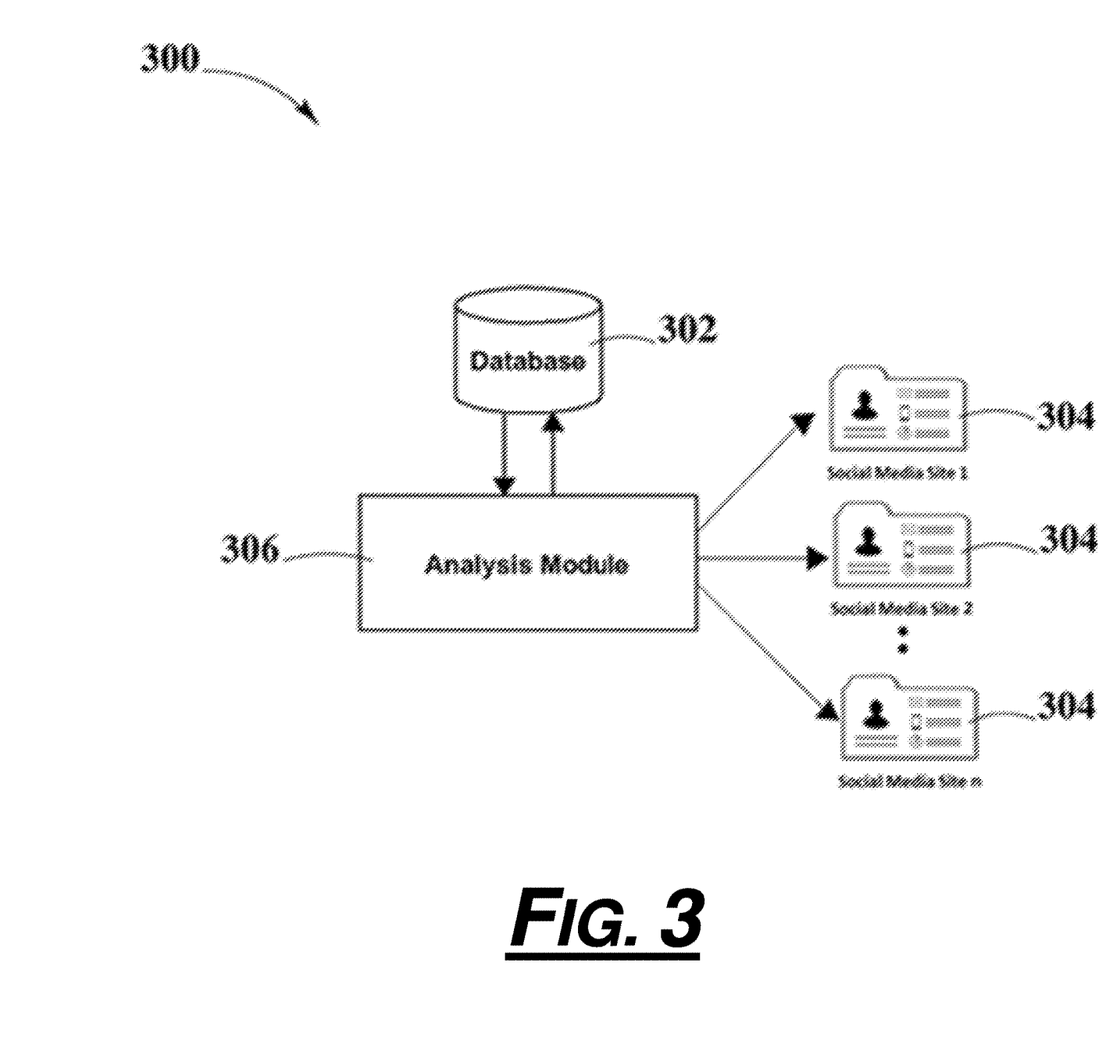
FIG. 3 is an exemplary block diagram of a sub-system of a portion of system architecture pertaining to an agent tool, according to an exemplary embodiment.

FIG. 3 is an exemplary block diagram of a sub-system 300 of a portion of system architecture 100 pertaining to an agent tool such as, for example, the agent tool described in system architecture 100 of FIG. 1. In FIG. 3, sub-system 300 includes database 302, social media sites 304 and analysis module 306. It should be understood that system architecture 100 can include less components, more components, or different components depending on the desired analysis goals. In an example referring to FIG. 1, analysis module 306 is implemented as analysis module 106 within system architecture 100. In FIG. 3, analysis module 306 is operatively coupled to and in two-way communication with database 302 and social media sites 304.

Analysis module 306 is implemented as one or more computer software modules that include programmatic rules or logic for executing/running different user interfaces to identify one or more high value targets. According to some embodiments, analysis module 306 is configured to process search requests from an agent, to identify one or more potential customers who satisfy the agent's search criteria. In this embodiment, the search criteria is a geographic region, a particular group of people associated with any economic, industrial and/or commercial activity, or a combination of both, among other search criteria.

Further to this embodiment, analysis module 306 scans a plurality of social media sites 304, and identifies those individuals who satisfy the agent's search criteria. Examples of social media sites 304 include rich site summary feeds, social news sites, book marking sites, blogging sites and social networking sites such as Facebook, LinkedIn, and the like. In this embodiment, analysis module 306 then identifies the profile of one or more members within one or more social media sites 304, who are associated with the profile of the previously identified individuals. Further to this embodiment, analysis module 306 compares the profile of those previously identified members, with the profile of pleased customers of a company. In one embodiment, the profile of pleased customers is obtained from database 302. If the profile of a member matches the profile of a pleased customer, then analysis module 306 characterizes the member as a pleased customer, and consequently characterizes the individuals associated with one or more pleased customers within one or more of social media sites 304, as high value targets. In some embodiments, analysis module 306 presents a list of high value targets to one or more agents. In one embodiment, the list of high value targets is sorted in descending order, according to the number of pleased customers who can refer each high value target.

In some embodiments, analysis module 306 generates a full profile for each high value target identified, using state of the art data mining and other data processing tools. In these embodiments, analysis module 306 stores the full profile of one or more high value targets in database 302 for further analysis to be performed by analysis module 106, and/or by one or more users of the system architecture 100.

Figure 4:
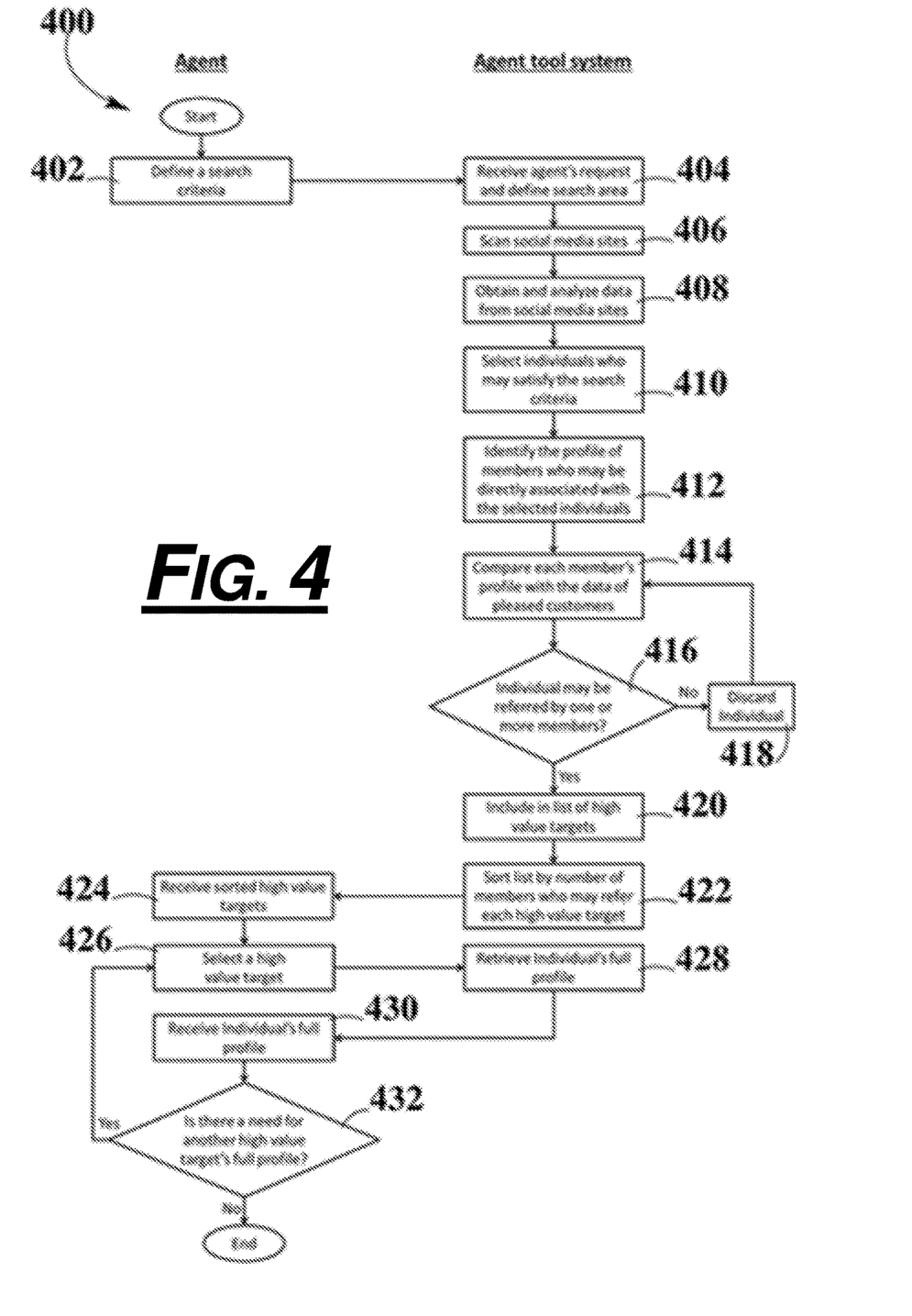
FIG. 4 is a flowchart of a process for requesting a list of high value targets within a particular area, according to an exemplary embodiment.

FIG. 4 is a flow chart of a process 400 for requesting a list of high value targets within a particular area, according to another embodiment. In this embodiment, an analysis module receives a search request from an agent to identify one or more potential customers who satisfy the agent's search criteria. In an embodiment, the search criteria is a geographic region, a particular group of people associated with any economic, industrial and/or commercial activity, or a combination of both, among other search criteria. Further to this embodiment, the analysis module generates a full profile for each high value target when needed.

A plurality of steps included in process 400 are performed by one or more computing devices such as, for example, computing device 200. Process 400 is implemented with components of the exemplary operating environments of FIGS. 1-3. The steps of process 400 are embodied in a computer readable medium containing computer readable code such that the steps are implemented when the computer readable code is executed by a computing device. In some implementations, certain steps of process 400 can be combined, performed simultaneously, or in a different order, without deviating from the objective of process 400.

Process 400 for requesting a list of high value targets starts at step 402, when an agent defines a single or multiple search criteria by interacting with a computing device displaying a user interface generated by an analysis module. In one embodiment, the search criteria is a geographic region, a particular group of people associated with any economic, industrial and/or commercial activity, or a combination of both. The user interface generates in analysis module a request for the identification of high value targets within the area defined by the agent's search criteria. Process 400 then advances to step 404.

At step 404, analysis module receives the agent's search criteria and defines the limits of the searching area for new potential customers using network mapping techniques. Process 400 then advances to step 406.

At step 406, the analysis module scans a plurality of profiles in one or more social media sites, to identify one or more individuals who match the search criteria. Examples of social media sites include rich site summary feeds, social news sites, book marking sites, blogging sites and social networking sites such as Facebook, LinkedIn, and the like. Process 400 then advances to step 408.

At step 408, the analysis module derives and analyzes personal data from each individual's profile using data mining and other data processing tools to identify the individual's associations with one or more members within a plurality of social media sites. The individual's personal information includes name, address, phone number, birth place, relationship status, birth date, age, number of children, preferences, habits, skills, career, direct association with others members' profile within the social media site, and/or any other information describing, identifying or otherwise connected to any profile. In this embodiment, the analysis module identifies the individual's associations with one or more members within a plurality of social media sites in one or more types of direct associations such as, for example, friendships, business relationships, acquaintances, community associations, activity partner associations, common interest associations, common characteristic associations, common geographic association or any other type of direct association between profiles. Process 400 then advances to step 410.

At step 410, the analysis module selects one or more individuals matching the search criteria defined by the agent in step 402, based on the analysis performed in step 408. Process 400 then advances to step 412.

At step 412, the analysis module identifies and selects one or more members within one or more social media sites, who are associated with the profile of the individuals selected in step 410. In this embodiment, the members within the social media site may be any person regardless of their geographic location or their association to any economic, industrial and/or commercial activity. Further to this embodiment, the analysis module also derives and analyses personal information derived from the profile of these selected members to determine if these members are please customers of a company. The member's personal information includes name, address, phone number, birth place, relationship status, birth date, age, number of children, preferences, habits, skills, career, and/or any other information describing, identifying or otherwise connected to any profile. Process 400 then advances to step 414.

At step 414, the analysis module compares the profile of each member selected and analyzed in step 412 with the profile of pleased customers of the company. In one embodiment, the profile of the company's pleased customers is obtained from a database of the company. In this embodiment, the profile of pleased customers includes name, address, phone number, birth place, birth date, age, and number of children, among other attributes. Process 400 then advances to step 416.

At step 416, the analysis module determines if one or more members' profile match the profile of a pleased customer. If the member's profile does not match the profile of a pleased customer, then process 400 advances to step 418. However, if one or more members' profile match the profile of a pleased customer, then the analysis module characterizes the member as a pleased customer who may refer the individual to the company. As a result, the analysis module characterizes as high value target with high referral potential, the individuals selected in step 410 that are associated with the profile of a member who is a pleased customer of the company; process 400 then advances to step 420.

At step 418, if the individual selected at step 410 does not exhibit high referral potential in step 416, then the analysis module discards the individual. Process 400, then advances to step 414 to compare the profile of another member and determine whether the profile of this member matches the profile of a pleased customer of the company.

At step 420, the analysis module includes the individuals selected at step 410, exhibiting high referral potential at step 416, in a list of high value targets. The analysis module performs data processing operations to generate a list of high value targets. Process 400 then advances to step 422.

At step 422, the analysis module sorts the list generated in step 420, in descending order according to the number of pleased customers who may refer each high value target to the company. Process 400 then advances to step 424

At step 424, one or more agents receive the sorted list generated in step 422, through the user interface generated by the analysis module on their computing device. Process 400 then advances to step 426.

At step 426, the agent selects a high value target from the sorted list displayed through a computing device in step 424, by interacting with the computing device via an input/output device, to retrieve the full profile of the selected high value target. Process 400 then advances to step 428.

At step 428, the analysis module receives the agent's retrieval request and generates the full profile of the high value target selected in step 426. In one embodiment, the full profile of a high value target is generated based on personal information derived from one or more social media sites where the high value target may have a personal profile. In this embodiment, the full profile of the high value target includes information such as background associations, a personal profile and family members, among others. In one embodiment, the profile of each high value target generated is stored in the company's database. Process 400 then advances to step 430.

At step 430, the analysis module displays, through the user interface on the agent's computing device, the full profile of the high value target requested by the agent in step 426. Process 400 then advances to step 432.

At step 432, the analysis module determines whether there is a need to retrieve another high value target's full profile. If there is a need to retrieve another high value target's full profile, then process 400 advances to step 426 to select, generate and display the full profile of at least one more high value target. Otherwise, process 400 ends.

By executing process 400 through the exemplary operating environments shown in FIGS. 1-3, big data analytics and data mining techniques can be implemented for a more efficient and faster processing of larger data sets. Big data analytics allows the financial institution to leverage rich information generated by individuals through their activity in one or more social media sites to profile potential customers in a far-reaching manner than possible with human-intervention data-driven analysis. In this way, efficiencies are created by providing ways for improving sales of insurance products to potential customers as compared to conventional processes employing established methodology. These features allow performing large work such as time consuming analysis in a more efficient manner than other approaches such as manual work performed by humans.

Figure 5:
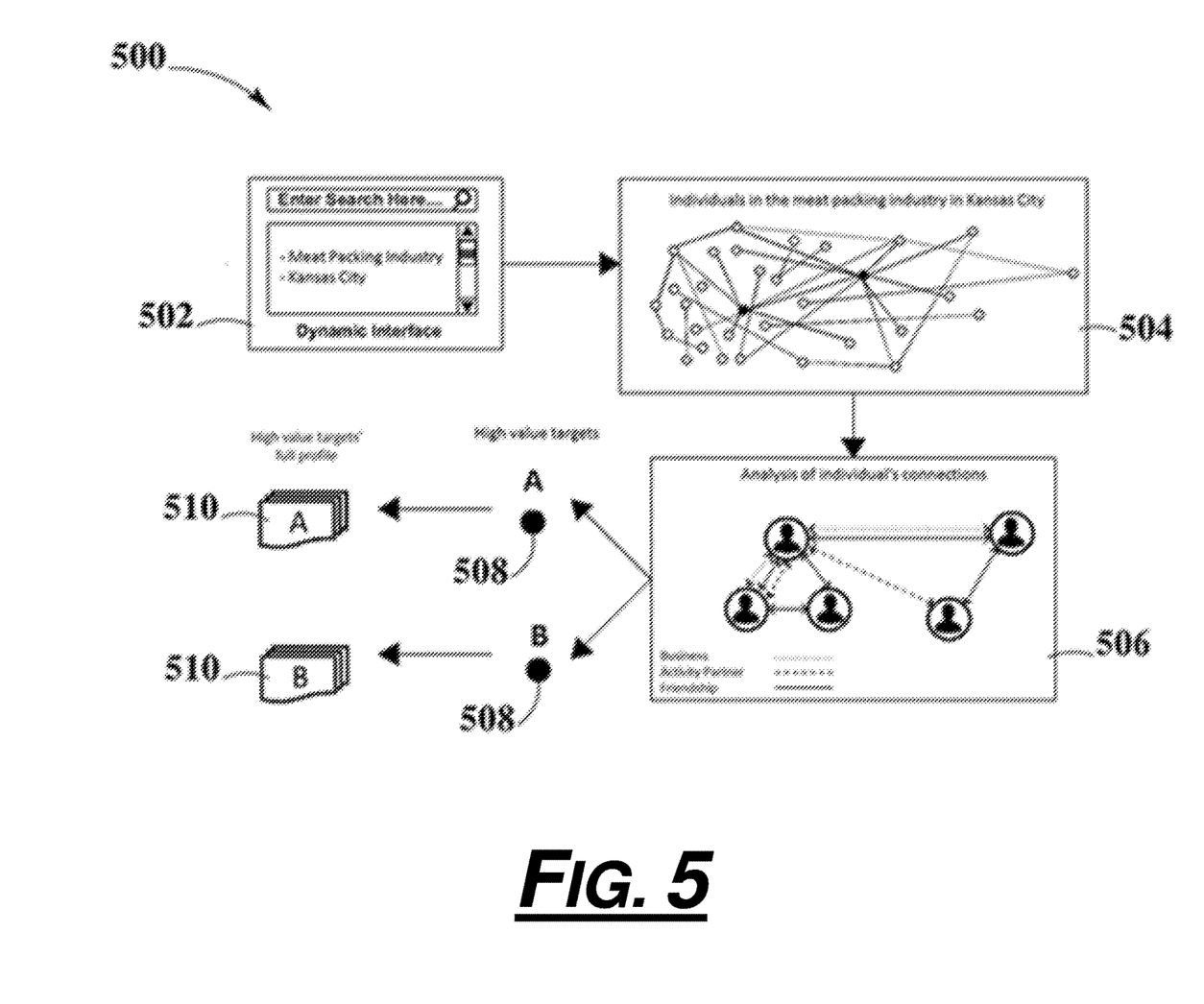
FIG. 5 is an exemplary block diagram of a search and selection process of high value targets within a particular area, according to an exemplary embodiment.

FIG. 5 is an exemplary block diagram 500 of a search and selection process of high value targets within a particular area, according to some embodiments of the present disclosure. In some embodiments, the search and selection process of high value targets describes by exemplary means, the main steps of the process for identifying high value targets, based on the activity of individuals in a plurality of social media sites, as described in process 400 of FIG. 4. Block diagram 500 is executed by means of a computing device such as, for example, computing device 200. Block diagram 500 is implemented with components of the exemplary operating environments of FIGS. 1-3. The parts and/or functions of block diagram 500 are embodied in a computer readable medium containing computer readable code such that the parts and/or functions are implemented when the computer readable code is executed by a computing device. In some implementations, certain parts and/or functions of block diagram 500 can be combined, performed simultaneously, or in a different order, without deviating from the objective of block diagram 500.

In some embodiments, an analysis module generates a user interface 502 configured to receive requests from one or more agents. User interface 502 is displayed to one or more agents by means of a computing device such as, for example, computing device 200. In this embodiment, the agent interacts with user interface 502 to request a list of high value targets within a particular area via an input/output device. The agent's request includes a single or multiple search criteria, which limits the searching area of high value targets. The search criteria is a geographic region, a particular group of people associated with any economic, industrial and/or commercial activity, or a combination of both, among other search criteria.

In some embodiments, the analysis module receives the search criteria from user interface 502 and uses network mapping 504 techniques and the activity of a plurality of individuals in one or more social media sites, to pilot a solution and identify individuals who satisfy the search criteria defined. Examples of social media sites include rich site summary feeds, social news sites, book marking sites, blogging sites and social networking sites such as Facebook, LinkedIn, and the like.

In an embodiment, the analysis module uses state of the art data mining and other data processing tools to analyze 506 the personal information of each previously identified individual, and identify one or more members directly associated with the individuals within the social media site. The individual's personal information includes name, address, phone number, birth place, relationship status, birth date, age, number of children, preferences, habits, skills, career, direct association with others members' profile within the social media site, and/or any other information describing, identifying or otherwise connected to any profile. In this embodiment, the analysis module identifies the individual's associations with one or more members within a social media site in one or more types of direct associations such as, for example, friendships, business relationships, acquaintances, community associations, activity partner associations, common interest associations, common characteristic associations, common geographic association or any other type of direct association between profiles. In this embodiment, the analysis module compares the profile of the previously identified members, with the profile of pleased customers stored in a company's database. The members within the social media site may be any person regardless of their geographic location or their association to any economic, industrial and/or commercial activity.

If the analysis module determines that one or more members' profile match the profile of a pleased customer, then the analysis module characterizes the member as a pleased customer who may refer the individual to the company. As a result, the analysis module characterizes as a high value target 508 with high referral potential, one or more previously selected individuals that are associated with the profile of a member who is a pleased customer of the company. In this embodiment, the analysis module generates a list of high value targets 508. In one embodiment the generated list of high value targets 508 is sorted in descending order according to the number of members who may refer each high value target 508 to the company. Further to this embodiment, the agents receives the sorted list through user interface 502 on the agent's computing device.

In some embodiments, the agent selects a high value target 508 from the sorted list, by interacting with the computing device displaying the user interface generated by the analysis module, to retrieve a full profile 510 of high value target 508. In these embodiments, the analysis module receives the agent's retrieval request and generates full profile 510 based on the high value target's personal information derived from one or more social media sites where high value target 508 has a personal profile. Further to these embodiments, the analysis module displays full profile 510 of high value target 508 to one or more agents, when needed. Full profile 510 includes information such as background associations, a personal profile and family members, among others.

An example of the processes described herein is disclosed below.

In one example, a list of high value targets are identified employing the processes described in FIGS. 4-5 which is implemented with components of the exemplary operating environments of FIGS. 1-3. An agent needs to find individuals with high referral potential within the meat packing industry in Kansas City. The agent then defines meat packing industry and Kansas City as a multiple search criteria in the user interface generated by an analysis module on his laptop. The analysis module receives the search criteria therefore limiting the search area. Then, the analysis module scans a plurality of social media sites, analyzes personal information pertaining to one or more individuals and selects one or more individuals who satisfy the search criteria. Subsequently, the analysis module runs an analysis process to identify the profile of one or more members within the social media sites scanned, which are associated with the profile of the previously identified individuals. The analysis module then compares the profile of those members with the profile of pleased customers of a company. If both profiles match, then the analysis module characterizes the member as a pleased customer, and as a result, the analysis module characterizes the individual associated with the profile of the member who is a pleased customer, as a high value target with high referral potential in the meat packing industry in Kansas City. The analysis module includes the two high value targets found within the meat packing industry in Kansas City, in a list which is sorted in descending order according to the number of pleased customers who can refer each high value target. Moreover, the analysis module generates and provides the full profile of one or both high value targets to the agent when needed. This full profile provides an agent with the required information to establish communication with new prospects and offer them appropriate products and services from the company according to the customer's needs.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be used in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
   scanning, by a server, a plurality of social networking sites based on one or more search criteria received from an electronic device of an agent to identify a plurality of first user profiles matching the search criteria;
   identifying, by the server, at least one second user profile connected to at least one of the plurality of first user profiles using a rich site summary feed associated with the at least one first user profile and the at least one second user profile, wherein the plurality of first user profiles correspond to potentially new customers of the agent's company;
   identifying, by the server, a subset of the at least one second user profile that satisfies a threshold, each of the second user profiles corresponding to an existing satisfied customer of the agent's company; and
   displaying, by the server on an electronic device, a list of the plurality of first user profiles ordered based upon how many second user profiles within the subset of the second user profile are associated with the respective first user profile.

2. The method of claim 1, wherein the search criteria is based on a geographic area.

3. The method of claim 1, further comprising:
presenting, by the server, a profile of at least one second user within the subset of the second user profiles.

4. The method of claim 1, wherein the search criteria is based on a business sector associated with at least one of the plurality of first user profiles and the at least one second user profile.

5. The method of claim 1, further comprising displaying, by the server, at least one of name, address, phone number, birth place, relationship status, birth date, age, number of children, preferences, habits, skills, or career associated with at least one of the plurality of first user profiles or the at least one second user profile.

6. The method of claim 1, wherein the electronic device establishes a communication session with at least one is associated with at least one first user.

7. The method of claim 1, wherein at least one of plurality of first user profiles corresponds to a high value target.

8. The method of claim 1, further comprising, when the server receives an indication that a user has interacted with at least one of the first user profiles, displaying, by the server, a full profile of the at least one first user profile.

9. A computer system comprising:
an electronic device of an agent configured to transmit one or more search criteria to a server; and
a server in communication with the electronic device, the server configured to:
scan a plurality of social networking sites based on the one or more search criteria received from the electronic device to identify a plurality of first user profiles matching the search criteria;
identify at least one second user profile connected to at least one of the plurality of first user profiles using a rich site summary feed associated with the at least one first user profile and the at least one second user profile, wherein the plurality of first user profiles correspond to potentially new customers of the agent's company;
identify a subset of the at least one second user profile that satisfies a threshold, each of the second user profiles corresponding to an existing satisfied customer of the agent's company;
display, on the electronic device, a list of the plurality of first user profiles ordered based upon how many second user profiles within the subset of the second user profile are associated with the respective first user profile.

10. The computer system of claim 9, wherein the search criteria is based on a geographic area.

11. The computer system of claim 9, wherein the server is further configured to: present a profile of at least one second user within the subset of the second user profiles.

12. The computer system of claim 9, wherein the search criteria is based on a business sector associated with at least one of the plurality of first user profiles and the second user profile.

13. The computer system of claim 9, wherein the server displays at least one of name, address, phone number, birth place, relationship status, birth date, age, number of children, preferences, habits, skills, or career associated with at least one of the first user profiles or the at least one second user profile.

14. The computer system of claim 9, wherein the electronic device establishes a communication session with at least one is associated with at least one first user.

15. The computer system of claim 9, wherein at least one of the plurality of first user profiles correspond to a high value target.

16. The computer system of claim 9, wherein when the server receives an indication that a user has interacted with at least one of the first user profiles, the server displays a full profile of the at least one first user profile.

* * * * *